United States Patent
Llinas et al.

(10) Patent No.: US 6,388,029 B1
(45) Date of Patent: May 14, 2002

(54) PROCESS FOR OBTAINING POLYOLEFINS

(75) Inventors: Gerardo Hidalgo Llinas; Begoña Peña Garcia; Antonio Muñoz-Escalona; Jose Sancho Royo, all of Madrid (ES)

(73) Assignee: Repsol Quimica S.A., Madrid (ES)

( * ) Notice: Subject to any disclaimer, the term of this patent is extended or adjusted under 35 U.S.C. 154(b) by 168 days.

(21) Appl. No.: 09/584,518

(22) Filed: May 31, 2000

Related U.S. Application Data

(62) Division of application No. 08/844,012, filed on Apr. 18, 1997, now Pat. No. 6,143,685.

(30) Foreign Application Priority Data

Apr. 18, 1996 (ES) ................................. 9600882

(51) Int. Cl.[7] .............................. C08F 4/42; C08F 4/02
(52) U.S. Cl. ...................... 526/128; 526/160; 526/127; 526/129; 526/943; 502/152; 502/117; 502/120; 502/121; 502/122; 502/123; 502/155
(58) Field of Search ................................. 526/160, 943, 526/127, 128, 129; 502/152, 117, 120, 121, 122, 123, 155

(56) References Cited

U.S. PATENT DOCUMENTS

| | | | |
|---|---|---|---|
| 3,184,416 A | 5/1965 | Mottus | 252/429 |
| 3,440,237 A | 4/1969 | Mottus | 260/49.9 |
| 4,659,685 A | 4/1987 | Coleman, III et al. | 502/113 |
| 4,808,561 A | 2/1989 | Welborn, Jr. | 502/104 |
| 4,939,217 A | 7/1990 | Stricklen | 526/114 |
| 5,032,562 A | 7/1991 | Lo et al. | 502/111 |
| 5,057,475 A | 10/1991 | Canich et al. | 502/104 |
| 5,064,797 A | 11/1991 | Stricklen | 502/111 |
| 5,627,246 A * | 5/1997 | Langhauser et al. | 526/128 |
| 5,824,620 A | 10/1998 | Vega et al. | 502/117 |

FOREIGN PATENT DOCUMENTS

| | | |
|---|---|---|
| DE | 1 022 382 | 5/1963 |
| DE | 38 40 772 | 6/1990 |
| EP | 0 206 794 | 12/1986 |
| EP | 0 260 130 | 3/1988 |
| EP | 0 277 004 | 8/1988 |
| EP | 0 293 815 | 12/1988 |
| EP | 0 314 797 | 5/1989 |
| EP | 0 323 716 | 7/1989 |
| EP | 0 336 593 | 10/1989 |
| EP | 0 361 866 | 4/1990 |
| EP | 0 367 503 | 5/1990 |
| EP | 0 368 644 | 5/1990 |
| EP | 0 447 070 | 9/1991 |
| EP | 0 474 391 | 3/1992 |
| EP | 0 628 566 | 12/1994 |
| WO | WO 91/09882 | 7/1991 |
| WO | WO 93/11172 | 6/1993 |

OTHER PUBLICATIONS

Collins et al., "Polymerization of Propylene Using Supported, Chiral, ansa–Metallocene Catalysts: Production of Polypropylene with Narrow Molecular Weight Distributions," *Macromolecules*, vol. 25, pp. 1780–1785 (1992).

Inoue et al., "C Nuclear Magnetic Resonance Spectroscopy of Polypropylene," *Die Makromolekulare Chemie*, vol. 168, pp. 163–172 (1973).

Kaminaka et al., Polymerization of propene with catalyst systems composed of $Al_2O_3$– or $MgCl_2$– supported $Et[IndH_4]$ $ZrCl_2$ and $AlR_3$ ($R=CH_3$, $C_2H_5$), *Makromol. Chem. Rapid Commun.*, vol. 12, pp. 367–372 (1991).

Soga et al., "Polymerization of Propene wtih highly isospecific $SiO_2$–supported zirconocene catalysts activated with common alkylaluminiums," *Macromol. Chem. Phys.*, vol. 195, pp. 3347–3360 (1994).

\* cited by examiner

*Primary Examiner*—David W. Wu
*Assistant Examiner*—Ling-Siu Choi
(74) *Attorney, Agent, or Firm*—Marshall, Gerstein & Borun

(57) ABSTRACT

Catalytic systems particularly suitable for the polymerization of α-olefins containing from two to 20 carbon atoms, as well as for the copolymerization of ethylene with α-olefins containing from three to 20 carbon atoms, dienes, and cycloalkenes in processes wherein the catalyst is suspended in a solvent, in processes in gas phase, as well as in mass polymerization processes at high temperatures and pressures, are disclosed. The catalytic system is a mixture of a catalyst component A and a co-catalyst component B. The catalyst component A is formed by a functionalized inorganic porous oxide, by an organoaluminium compound and by an organometallic compound of a metal of the groups 3, 4, 5, or 6 of the periodic table. Functionalization of the inorganic oxide is by introduction of functional groups to be used to strongly fix the organoaluminium compound and the organometallic compound. The co-catalyst component B, which is used for the activation of the catalyst, is formed of organoaluminium compounds, perfluorinated derivatives of boron, or a mixture thereof.

24 Claims, 4 Drawing Sheets

PROCESS FOR OBTAINING POLYOLEFINS

CROSS REFERENCE TO RELATED APPLICATION

This is a division of a U.S. application Ser. No. 08/844,012 filed Apr. 18, 1997, now U.S. Pat. No. 6,143,685.

The metallocene catalsts in combination with aluminium alkyls are scarcely active for the polymerization of olefins (U.S. Pat. No. 2,827,446). The controlled addition of small quantities of water to the polymerization medium remarkably increases the activity thus obtaining, sometimes, activities which are greatly higher than the ones obtained by using the known catalysts Ziegler-Natta (Makrom. Chem. 179, 2553 (1978) and 169, 163 (1973), DE 1022382, U.S. Pat. No. 3,184,416, U.S. Pat. No. 3,440,237). The controlled hydrolysis of alkyl aluminium leads to the obtainment of the corresponding aluminoxanes. When these aluminoxanes are used as activators of metallocene catalysts a very active catalytic system for the polymerization of olefins is obtained, particularly with zirconocene catalysts (U.S. Pat. No. 4,542,199).

On the other hand it was found out (EP 277004 and EP 426637) that the use of bulky boron compounds as co-catalysts enables high activities in the polymerization of $\alpha$-olefins too. The co-catalysts act by forming and stabilizing the active cations by means of non-coordinative anions, without preventing the incorporation of olefin during polymerization.

These catalytic systems are homogeneous catalysts soluble in the known solvents used in the polymerization of olefins and form very small polymer particles (<100 $\mu$m). Therefore, when these systems are used in gas phase or in suspension, a fouling or blocking of the reaction systems often takes place, thus forcing the stopping of the polymerization plant causing a loss in the production.

For these reasons, it is suitable to develop the heterogeneous catalysts which are able to keep the catalytic activity of the homogeneous systems and to control the dimensions and the morphology of the resulting polymer for the obtainment of particles greater than 100 $\mu$m and a high density of particles in the reactor (apparent density).

Works concerning the development of these catalytic solids have been carried out for many years. In general, the more used methods consist in the heterogeneization of the co-catalyst, the heterogeneization of the metallocene compound or in the heterogeneization of both components on an appropriate support.

The patent WO 91/09882 discloses the preparation of a supported catalytic system useful for the polymerization of olefins in suspension or in gas phase, which is formed by a homogeneous metallocene compound and an ionic non-coordinative co-catalyst of boron supported on an inorganic porous oxide. The support and the co-catalyst are physically joined, this fact can cause the migration to the reaction medium of the co-catalyst, thus obtaining products with a low apparent density and with a wide distribution of particle sizes. Moreover, the catalytic activity is very small. In a later patent (WO 93/11172) a method of lieterogeneization of said type of co-catalysts consisting in the functionalization of the boron co-catalyst bv means of two methods is disclosed. In one of them, the functionalization takes place with groups able to react with the free hydroxyl-groups of an inorganic support and, in the other method, functional groups are introduced in order to enable the later polymerization of the boron compound, creating an insoluble polymer in the reaction medium. Even though the chenmical anchorage of the co-catalyst assures that the active centers do not migrate in the reaction medium, these methods are chemically and economically expensive.

The patent EP 293 815 discloses the heterogeneization of metallocene catalysts supported on the inorganic oxides by the chemical reaction betwveen the functional alcoxysilane groups of the organometallic compounds and the surface hydroxyl groups of the inorganic oxides. The activity in the polymerization is not very high, probably as a consequence of the possible deactivation of the metallocene for the secondary products, which are formed during the reaction with the support.

The patent DE 3 840 772 A1 discloses the preparation of metallocene catalysts supported by reaction, between poly (methylhydrogensiloxane) and functionalized metallocenes with vinylic groups in the presence of a platinum catalyst. The process of synthesis and further anchorage of this kind of metallocene compounds are economically very expensive and the purity degree of tlhe supported metallocene is not the desired one resulting in very low polymerization activities.

The patents U.S. Pat. No. 4,659,685, EP 318 048, U.S. Pat. No. 50,302,562, EP 260 130 and EP 447 070 disclose the preparation of heterogeneous catalysts by directy supporting a non-metallocene compound of the metals of the groups 4, 5, or 6 of the periodic table on magnesium chloride, silica or aluminium phosphate, generally titanium halides, and a metallocene compound. The catalytic system is activated by the subsequent addition of aluminoxane or its mixtures with alkyl aluminium. The different polymerization rate of the titanium halides and of the metallocene compounds form multimodal polyolefins, by preventing the obtainment of polymers with a narrow and controlled polydispersity.

The patent EP 474 391 A2 and the studies of K. Soga (Macromol. Chem. Rapid Commun. 12, 367 (1991)) and of S. Collins (Macromoleculas 25, 1780 (1992)) disclose the preparation of heterogeneous metallocene catalysts by supporting them onto inorganic porous oxides, magnesium halides or their mnxtures, previously treated with organoaluminium compounds. The thus obtained catalysts are used in the polymerization of olefins in gas phase or in suspension and are activated with organoaluminium compounds. The resulting activities are very low and the obtained copolymers do not show a random distribution of the comonomer, thus developing two melting peaks. On the other hand, the metallocene compound cannot remain perfectly anchored because a migration in the polymerization medium may occur, with the relative obtainment of small particles.

The patent EP 628 566 and K. Soga in a study published in Makrom. Chem. Phys. 195, 3347 (1994) disclose the direct synthesis of metallocene catalysts on an inorganic support. The method consists in the chemical reaction between alkaline cyclopentadienyl cations and the functional groups of the support, the subsequent reaction of the resulting solid with halides of transition metals of groups 4, 5, or 6, allows the formation "in situ" of the metallocene onto the support. The resulting activities in polymterization are very low; this is probably due to the by-products of the synthesis reaction whose separation from the catalyst is difficult.

On the other hand, there are no clear evidences of the fact that for this process it is possible to synthesize directly and in a good yield, the organometallic complexes onto the supports.

The patents U.S. Pat. No. 5,057,475, EP 206 794 A1 and U.S. Pat. No. 4,701,432 A1 disclose a method for the preparation of supported metallocene aluminoxane catalytic systems, by means of the simultaneous or subsequent addition of a metallocene compound and an aluminoxane onto an appropriate support. These catalysts can be used in polymerizations with or without additional co-catalyst. But for some kind of uses, the produced polymers have molecular weights and incorporation of co-monomer below the desired level. Moreover, the absence of appropriate interactions between the catalytic components and the support could cause the migration of the organometallic compounds during polymerization.

The patents U.S. Pat. No. 4,939,217 and U.S. Pat. No. 5,064,797 disclose the preparation of a supported aluminoxane by means of bubbling of a moistened inert gas in a solution of alklyl aluminium in the presence of the support. When a solution of metallocene is added, a heterogeneous catalytic system with good activities in the polymerization of olefins is obtained. But the thus obtained aluminoxane particles could not remain completely anchored onto the inorganic support because neither the morphology, nor the distribution and the size of the particle are the desired ones for this kind of uses. Consequently the apparent density and homogenity of the polymer obtained by these heterogeneous catalysts is not the appropriate one. Moreover, for this method, the reproduction of the structure and of the molecular weight of the synthesized aluminoxane is very difficult, thus strongly jeopardizing the catalytic activity.

The patents EP 323 716, EP 361 866, EP 336 593, EP 367 503, EP 363 644 and U.S. Pat. No. 5,057,475 disclose the preparation of supported catalysts by means of the "in situ" formation of aluminoxane onto silica by the reaction of aluminium alkyls with small quantities of water (6–50%) contained in the silica. Then, they impregnate the metallocene compound on the silica covered with aluminoxane. There are no data concerning the morphology and distribution of the particles sizes of the resulting polymer, but small particles of polymer are probably obtained since the metallocene is not strongly kept on the support, because it could migrate in the reaction medium.

The patent EP 314 797 discloses the preparation of catalytic systems supported by means of impregnation of the metallocene compound onto supports obtained by the precipitation of aluminoxane in an aliphatic solvent in which the aluminoxane is insoluble or by the co-precipitation with inert components such as polyethylene or inorganic solids totally or partially dehydroxylated. The thus formed catalyst is pre-polymerized by using organoaluminium compounds as co-catalysts. The polymerization activities are good but they do not supply data concerning the morphology and the distribution ot the particle sizes.

In the present invention a process for the obtainment of heterogeneous catalytic systems is described by using properly functionalized inorganic supports and metallocene catalysts. The use of these functionalized supports involves a strong anchorage between the catalytic support and the active species preventing their separation in the polymerization medium. The described method allows the obtainment of metallocene heterogeneous catalyst which properly control the morphology and the distribution of the particle sizes showing typical catalytic activities of the homogeneous catalysts.

DETAILED DESCRIPTION OF THE INVENTION

In the present invention heterogeneous catalytic systems resulting from the mixture of two components A and B are described, which are able to polymerize and co-polymerize α-olefins, especially to homopolymerize ethylene and co-polymerize ethylene with α-olefins. The catalytic activities are similar to those of the homogeneous catalysts. The polymers obtained with this kind of catalytic systems are characterized in that they have narrow distribution of molecular weights show a good distribution of the particle sizes and they reproduce the morphology of the catalytic support. Moreover, these catalysts are particularly suitable in the incorporation of the co-monomer, by forming copolymers with completely random co-monomer distributions.

Thus it is an object of the present invention to provide a catalyst component (A) for the polymerization of α-olefins in suspension, in gas phase at low and high pressures and temperatures or in a mass at high pressures and high or low temperatures, comprising:

a) a functionalhzed support (A.1) result from the reaction of an inorganic porous support constituted by one or more oxides of the elements of groups 2, 13 or 14 of the periodic table, dehydrated or not and a functionalizing compound of general formula:

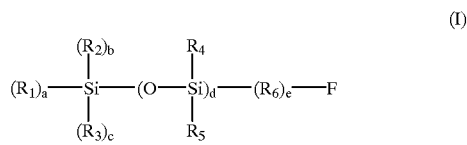

(I)

wherein:

$R_1$ is halogen, alkoxide of formula OR, R being a branched or a linear alkyl having from 1 to 6 carbon atoms, a $C_5$–$C7$ cycloalkyl, a $C_6$–$C_{10}$ aryl, a $C_2$–$C_{10}$ alkenyl, a $C_7$–$C_{10}$ arylalkyl or a $C_7$–$C_{40}$ alkylaryl;

$R_2$, $R_3$, $R_4$ and $R_5$, equal to or different from each other, are linear or branched $C_1$–$C_6$ alkyl, $C_5$–$C_7$ cycloalkyl $C_6$–$C_{10}$ aryl, $C_2$–$C_{10}$ alkenyl, $C_7$–$C_{10}$ arylalkyl, or a $C_7$–$C_{40}$ alkylaryl;

$R_6$ is a methylene or propylene group;

F is selected from the group consisting of: —$NH_2$, —NHR, —SH, —OH, or —PHR wherein R has the above defined meaning;

the addition of a+b+c is equal to 3, a being always higher than 0;

d, e can have independently values between 0 and 10;

b) an organo aluminium compound (A.2)

c) one or more metallocene complexes of groups 3, 4, 5 and 6 of the periodic table (A.3) represented by the general formula III:

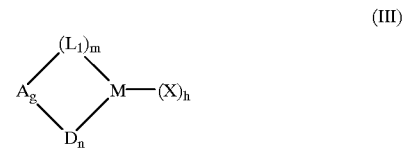

(III)

wherein:

M is a transition metal of the groups 3, 4, 5 or 6 of the periodic table;

Each X is independently selected from the group consisting of hydrogen, halogen, linear or branched alkyl having from 1 to 10 carbon atoms, $C_1$–$C_{10}$ alkoxyl $C_5$–$C_7$ cycloalkyl, $C_6$–$C_{10}$ aryl, $C_6$–$C_{10}$ aryloxyl, $C_2$–$C_{10}$ alkenyl, $C_7$–$C_{10}$ arylalkyl, $C_7$–$C_{40}$ alkylaryl or $C_8$–$C_{40}$ arylalkenyl;

$L_1$ is selected from the group consisting of: cyclopentadienyl (Cp) of formula:

(h)

indenyl (Ind) of formula:

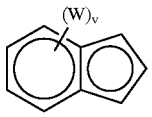
(i)

fluorenyl (Flu) of formula:

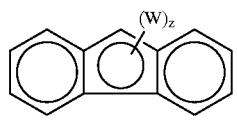
(l)

wherein W is independently selected from the group consisting of hydrogen, linear or branched alkyl groups from 1 to 10 carbon atoms, $C_5$–$C_7$ cycloalkyl which can be substituted by an alkyl having from 1 to 6 carbon atoms, $C_6$–$C_{10}$ aryl, $C_2$–$C_{10}$ alkenyl, $C_7$–$C_{10}$ arylalkyl or $C_7$–$C_{40}$ alkylaryl, a group of general formula (IV):

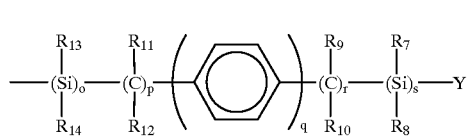
(IV)

wherein:

$R_7$, $R_8$, $R_9$, $R_{10}$, $R_{11}$, $R_{12}$, $R_{13}$ and $R_{14}$, equal or different from each other are hydrogen, linear or branched alkyl groups having from 1 to 10 carbon atoms, $C_5$–$C_7$ cycloalkyl, which can be substituted by an alkyl having from 1 to 6 carbon atoms, $C_6$–$C_{10}$ aryl, $C_2$–$C_{10}$ alkenyl, $C_7$–$C_{10}$ arylalkyl or $C_7$–$C_{40}$ alkylaryl, $R_7$ and $R_8$ can also be equal to Y;

Y can be a halogen (i.e. F, Cl, Br I) or $NR_{11}R_{12}$ or hydroxyl;

o, p, q, r, s are integers which can have values comprised between 0 and 10;

$u=5-g$;

$v=7-g$;

$z=9-g$;

D has the meaning of $L_1$ or is an heteroatom belonging to 13, 14, 15, or 16 groups of the periodic table;

A is a group which binds the ligands $L_1$ and D according to the formula (V):

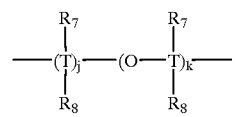
(V)

wherein T is carbon, silicon, germanium or tin; and $R_7$ and $R_8$ are those previously defined; j is an integer which can have the values of 0, 1, 2, 3 or 4; k is an integer which can have the values of 0, 1, 2 or 3;

n, m and h are integers so as their addition is equal to 4; m and n have the values of 0.1 or 2 so that their addition can be only 1 or 2; h can never be higher than 3; g is an integer comprised between 0 and 2; when h is equal to 3 then the sum of m+n is equal to 1 and g is 0.

Preferably the metallocene for the preparation of the supported catalyst A are represented by the following formula (IIIa):

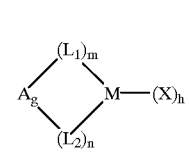
(III)a wherein

M is a transition metal of the groups 3, 4, 5 or 6 of the periodic table;

Each X is independently selected from the group consisting of hydrogen, halogen, linear or branched alkyls having from 1 to 10 carbon atoms, $C_1$–$C_{10}$ alkoxyl, $C_5$–$C_7$ cycloalkyl, $C_6$–$C_{10}$ aryl, $C_6$–$C_{10}$ aryloxyl, $C_2$–$C_{10}$ alkenyl, $C_7$–$C_{10}$ arylalkyl, $C_7$–$C_{40}$ alkylaryl or $C_8$–$C_{40}$ arylalkenyl;

$L_1$, $L_2$ are independently selected from the group consisting of: cyclopentadienyl (Cp) of formula:

(h)

indenyl (Ind) of formula:

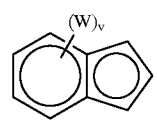
(i)

or fluorenyl (Flu) of formula:

(l)

wherein each W is independently selected from the group consisting of hydrogen, linear or branched alkyl group from 1 to 10 carbon atoms, $C_5$–$C_7$ cycloalkyl wlich can be substituted by an alkyl having from 1 to 6 carbon atoms, $C_6$–$C_{10}$ aryl $C_2$–$C_{10}$ alkenyl, $C_7$–$C_{10}$ arylalkyl or $C_7$–$C_{40}$ alkylaryl, a group of general formula (IV):

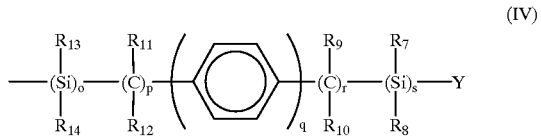

wherein:

$R_7$, $R_8$, $R_9$, $R_{10}$, $R_{11}$, $R_{12}$, $R_{13}$ and $R_{14}$, equal to or different from each other are hydrogen, linear or branched alkyl groups having from 1 to 10 carbon atoms, $C_5$–$C_7$ cycloalkyl, wiich can be substituted by an alkyl having from 1 to 6 carbon atoms, $C_6$–$C_{10}$ aryl, $C_2$–$C_{10}$ alkenyl, $C_7$–$C_{10}$ arylalkyl or $C_7$–$C_{40}$ alkylaryl, $R_7$ and $R_8$ can also be equal to Y;

Y can be a halogen (F, Cl, Br I) or $NR_{11}R_{12}$ or hydroxyl;

o, p, q, r, s are integers which can have values comprised between 0 and 10;

u=5-g;
v=7-g;
z=9-g;

A is a group which binds the ligands $L_1$ and $L_2$ according to the formula (V):

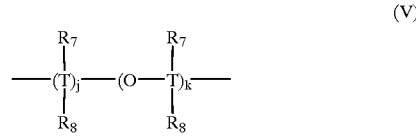

wherein T is carbon, silicon, germanium or tin; and $R_7$ and $R_8$ are those previously defined; j is an integer which can have the values of 0, 1, 2, 3 or 4; k is an integer which can have the values of 0, 1, 2 or 3;

m, n, and h are integers so as their addition is equal to 4; m and n have the values of 0, 1 or 2 so that their addition can be only 1 or 2; h can never be higher than 3; g is an integer comprised between 0 and 2; when h is equal to 3 then m+n are equal to 1 and g is 0.

In the metaflocene of formula (III) and (IIIa) M is preferably selected from the group consisting of Ti, Zr or Hf. This catalyst component can be used with a co-catalyst which is employed for the activation of the metallocene and it is constituted by non-coordinative ionising compounds; preferably said co-catalyst is selected from the group consisting of methylaluminoxane or boron bulky compounds.

The used catalytic support can be an inorganic compound having a spherical morphology and with superficial hydroxyl groups such as: oxides, silicates, carbonates phosphates, clay and their mixtures. Catalytic supports which are preferably used are silica, alone or in combination with oxides of aluminium, titanium, vanadium, chromium, phosphorous, aluminium and phosphorous or their mitures. The stuface area of these supports can vary between 10–1000 m²/g preferably between 150–650 m²/g, the pore volume can vary preferably between 0.2–4 cm³/g preferably between 0.6–2.7 cm³/g and the average particle size can vary between 1–500 μm, preferably between 5–200 μm.

Generally these inorganic supports have different contents of water which can be removed or not. Supports are preferably thermally treated in order to remove the water and reduce at will the concentration of the superficial hydroxyl groups. Said treatment is carried out in a fluidized bed by heating the support in the presence of a dry inert gas, at temperatules comprised between 100 and 1000° C. and preferably between 200 and 800° C. Once the drying process is completed, the support can be stored for a long time in the absence of air and humidity.

Once calcined the content of hydroxy groups on the surface of she support can be determined by means of a volumetric evaluation of the separated ethane by treating a suspension of the support with a volume of a solution of triethylaluminium in a hydrocarbon solvent. The surface concentration of hydroxyl group depends on the calcination temperature and can vary between 0.1 and 4 meq OH/g of support, preferably bet een 0.3–3 meq OH/g of support.

The functionalization of the catalytic support is carried out by reaction between the surface hydroxyl group of the inorganic support and the reactive groups $R_1$, of the compound ol formula (I), in molar ratios OH/$R_1$ comprised between 0.10 and 6, preferably between 0.2 and 4. The reaction is carried out in aliphatic or aromatic hydrocarbon solvents (toluene, heptane, etc.), by keeping the temperature of the reaction medium between 25° C. and 150° C., working preferably between 50 and 130° C. and for 5–36 hours, preferably between 10–30 hours. The reaction by-products which are generally inert, can be easily removed by filtration and washing with hydrocarbon solvents. The resulting solids have the general formula (II):

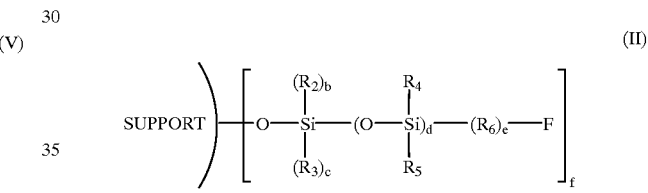

the functional groups will be more or less close to the surface of the support, depending on the value of d and e. The value of f depends on the concentration of hydroxyl groups on the surface of the support and on the molar ratios OH/$R_1$ used in the silanization reaction.

The supported catalysts of the present invention are prepared by adding the organo aluminium compound to a suspension formed by the functionalized catalytic support and the solvent. Afterwards, on the resulting solid, a solution formed by one or more metallocene organometallic complexes of the elements of the groups 3, 4, 5 or 6 of the periodic table and a hydrocarbon solvent are added. It is desirable that the formed reaction byproducts be inert, volatile or easily extractable from the medium with the aim of avoiding that the catalytic system is contaminated; the catalytic activity could be jeopardized.

The quantity of the organoaluminium compound used can vary from 0.05 to 30 mmoles of Al/g of support, preferably the concentration will be in the range from 1 to 15 mmoles Al/g of support. The reaction is carried out during 1–24 hours, preferably between 2 and 15 hours, in a temperature range comprised between 15 and 200° C., preferably between 20 and 150° C. The solids obtained by this process show aluminium contents comprised between 2 and 20%, preferably between 5 and 15%. The quantity of metallocene added to the functionalized support covered with organoaluminiuim can vary between 0.01 and 10 mmoles of metal/g of support, preferably between 0.1 and 7 mmoles of metal/g of support. The reaction is carried out at temperatures comprised between 0 and 190° C., preferably between 20 and 130° C., during 1–20 hours, preferably between 2–15 hours. The content of the transition metal of the heterogeneous catalyst obtained depends on the content of aluminium of the support and can vary between 0.05 and 6%.

During the whole process both the chemical species and the solvents as well as the obtained products will be protected from oxygen and humidity. The heterogeneous catalysts will be stored in inert atmosphere, and will remain active in polymerization during long periods of time.

Further object of the present invention is a process for obtaining polyolefins characterized by the use of said catalytic system. The heterogeneous catalyst component (A), obtained according to the previous description, can be used in the polymerization or co-polymerization of α-olefins by addition of the co-catalysts, component B. These co-catalysts are non-coordinative ionizing compounds such as alkyl aluminoxanes or bulky perfluoro boron compounds. Representative but not limitative examples are methylaluminoxane, dimethylanilinotetrakis (pentafluorophenyl) boron and trispentafluorophenylborane. If boron derivatives are used, it is advisable to add to the polymerization medium small quantities of alkylaluminium (TIBA, TEA, TMA, etc.).

The so prepared catalytic systems are suitable for the polymerization of α-olefins lhaving from 2 to 20 carbon atoms, particularly for the polymerization of ethylene. and for the co-polymerization of ethylene with one or more α-olefins having from 3 to 20 carbon atoms, such as propylene, 1-butene, 4-methylpentene, 1-hexene, etc. with dienes and cycloalkenes. The polymerization can be carried out by polymerization processes in suspension, in gas phase or in mass at high pressures and tempcratures. In suspension polymerization it is used as a reaction medium a hydrocarbon solvent such as linear or branched aliphatic hydrocarbons (hexane, heptane, isobutane, etc.), cyclic hydrocarbons benzene, toluene, xylene, etc.) or a mixture thereof are used. The polymerization can be carried out between 1 and 2000 atmospheres and temperatures generaly between −60° C. and 280° C., optionally between 60 and 240° C., preferably between 40 and 180° C. and the polymerization time can vary between 20 seconds and 6 hours depending oil the process.

The used concentration of the supported metallocene catalyst (component A), referred to the transition metal (M), ranges from $10^{-7}$ to $10^{-3}$, preferably from $10^{-6}$ to $10^{-4}$ moles of transition metal/l of solvent. The co-catalyst (component B) is used in a concentration from $10^{-4}$ to $10^{-1}$, preferably from $10^{-3}$ to $10^{-2}$ moles/l of solvent. Higher concentrations of both components are also possible. When aluminoxanes are used as co-catalysts the used molar ratio Al/M generally ranges from 10 to 10000, optionally from 100 to 10000, preferably between 500 and 1500. When boron compounds are used, the molar ratio B/M varies between 0.5 and 10, preferably between 0.9 and 5.

The preparation of the catalytic system for the polymerization of olefins can be carried out by mixing the components A and B in the polymerization reactor saturated with monomer or by mixing the components out of the reactor and adding the mixture to the reactor.

The molecular weight of the obtained polymer can be controlled varying the concentrations of the catalyst, of the co-catalyst and of the monomer in the polymerization mediumn as well as the polymerization temperature with the addition of molecular weight regulators such as $H_2$. When in the preparation of the catalyst a single metallocene compound is used, polymers with narrow distributions of molecular weights ranging betveen Mw/Mn=2–4 are obtained. When two or more metallocene compounds are used, the obtained polymers have broader molecular weight distributions including multimodal distributions. Preferably, the polymer does not contain particles having size less than 100 μm.

The co-polymerization reaction can be realized by using the same process as the one used in the processes of homopolymerization but feeding furthermore the reaction medium with the appropriate comonomer(s). The preferred molar ratios comonomer/monomer are comprised between 0.1 and 5. Copolymers are obtained with controlled contents of comonomer, random distribution and density ranging from 0.87 to 0.96 g/cc.

In order to better clarify the invention, some examples are described below. The materials, chemical compounds and conditions utilized in these examples are used in an illustrative way and not as a limitation of the claims of the invention. The average molecular weights by number, by weight and their distribution have been defined by GPC or SEC permeation gel chromatography. The thermal properties of the polymers have been defined by using differential scarnig calorimetry. The intrinsic viscosities [η] have been obtained at 145° C. by viscosinetric teclnique, the solvent used being trichlorobenzene with 0.05% antioxidant in order to avoid degradation. The determination of the particle sizes and of their distribution was carried out by laser technique. The mophology of said particles has been defined by optical and electronic microscopy.

FUNCTIONALIZATION OF INORGANIC SUPPORTS

EXAMPLE 1

Support S-1

Figure 1:
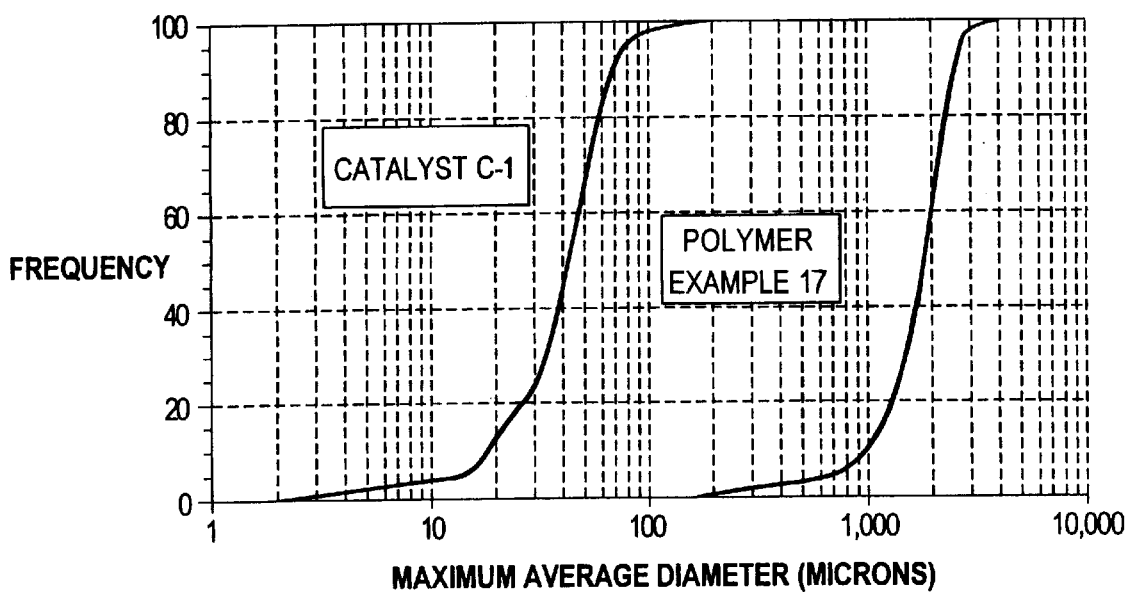
FIG. 1 shows the distribution of the particles of catalyst C-1 compared with the distribution of the particles of the polymer of example 17 wherein the catalyst C-1 has been used.

100 ml of diy toluene and 0.024 moles of 3-aminopropyltrimethoxysilane [$(MeO)_3Si(CH_2)_3NH_2$] were added to 10 g of silica previously calcined at 300° C. for a period of 4 hours having a specific surface area of 332 m$^2$/g which contained 1.3 mmoles of OH/g of silica.

The reaction mixture was heated at 110° C. and was kept for 12 hours at reflux. The resulting solid product was filtered and washed with different fractions of dry heptane (5×100 ml). The obtained white residue is dried at reduced pressure for 12 hours. The nitrogen content of the sample was 1.73% N.

EXAMPLE 2

Support S-2

The same process as in example 1 has been carried out but 20 g of a calcined silica having the same surface area and containing 2.2 mmoles of OH/g of silica were used. 0.04 moles of 3-mercaptopropyltrimethoxysilane [$(MeO)_3Si(CH_2)_3SH$] were added. The sulfur content of the sample was 1.86% S.

EXAMPLE 3

Support S-3

The same process as in example 1 has been carried out but 10 g of silica were used, whose specific surface area was 273 m$^2$/g and contained 1.8 mmoles of OH/g of silica after calcination at 300° C. during 4 hours. 6.8 mmoles of N-(phenyl)-3-aminopropyltrimethoxysilane [(MeO)$_3$Si (CH$_2$)$_3$NHPh] were added. The nitrogen content of the sample was 0.65% N.

EXAMPLE 4

Support S-4

The same process as in example 1 has been carried out but 4 g of silica were used whose specific surface area was 227 m$^2$/g and contained 0.74 mmoles of OH/g of silica and after calcination at 800° C. during 4 hours 12.2 mmoles of 3-aminopropyltrimethoxysilane [(MeO)$_3$Si(CH$_2$)$_3$NH$_2$] and it was kept at 120° C. for 24 hours were used. The nitrogen content of the sample was 1.15% N.

EXAMPLE 5

Support S-5

17.24 g of calcined silica having specific surface area of 273 m$^2$/g which contained 1.4 mmole OH/g of silica were put in an impregnation column. Further 250 ml of dry toluene were added and then 17.18 mmoles of 3-aminopropyltrimethoxysilane [(MeO)$_3$Si(CH$_2$)$_3$NH$_2$] dissolved in dry toluene were continuously fluxed into the column during 12 hours at room temperature. The resulting solid product was filtered and washed with different fraction of dry heptane (5×100 ml). The obtained white residue was dried at reduced pressure for 12 hours. The nitrogen content of the sample was 0.12% N.

PREPARATION OF THE CATALYST

EXAMPLE 6

Catalyst C-1

120 mmoles of methylaluminoxane (MAO) in 80 ml of toluene were added to 11 g of functionalized support S-1. The reaction mixture was kept at room temperature under continuous mechanical stining for 6 hours. The resulting solid was filtered and washed several times with toluene (5×100 ml). Afterwards the resulting solid was suspended in dry toluene and 3.4 mmoles of Cp$_2$ Zr Cl$_2$ were added. The reaction mixture was kept for 4 hours at room temperature under mechanical stirring. The solid in suspension was filtered and washed several times (5×100 ml) with dry toluene and then was dried for 12 hours under reduced pressure. The resulting solid catalyst contains 10.1% Al and 0.5% Zr.

EXAMPLE 7

Catalyst C-2

10.2 mmoles of methylaluminoxane (MAO) in 80 ml of toluene were added to 3.2 g of the functionalized support S-4. The reaction mixture was kept at 40° C. under continuous mechanical stirring for 2 hours. The resulting solid was filtered and washed several times with toluene (5×200 ml) and was dried under reduced pressure for 24 hours. Afterwards 2.9 g of the resulting solid were suspended in dry toluene and 0.24 mmoles of rac-Et[ind]$_2$ Zr Cl$_2$ were added. The reaction mixture was kept for 3 hours at 60° C. under mechanical stirring. The solid in suspension was filtered and washed several times (5×200 ml) with dry toluene and then was dried for 24 hours under reduced pressure. The resulting solid catalyst contains 0.95% N, 4.8% Al and 0.25% Zr.

EXAMPLE 8

Catalyst C-3

The same process as in example 6 was carried out but 5.5 g of support S-5, 37.5 mmoles of MAO and 1.7 mmoles of Cp$_2$ ZrCl$_2$ were used. The resulting solid catalyst contained 4.8% Al and 0.48% Zr.

EXAMPLE 9

Catalyst C-4

The same process as in example 6 was carried out but 6 g of the support S-3, 15 mmoles of MAO and 1.7 mmoles of Cp$_2$ZrCl$_2$ were used. The resulting solid catalyst contained 3.22% Al and 1.05% Zr.

EXAMPLE 10

Catalyst C-5

51.7 mmoles of methylaluminoxane (MAO) in 80 ml of toluene were added to 9.2 g of aminopropyl-silica with a N content of 1.96% and a specific surface of 189 m$^2$/g. The reaction mixture was kept at room temperature under continuous mechanical stirring for 2 hours. The resulting solid was filtered and washed several times with toluene (5×200 ml) and was dried under reduced pressure for 24 hours. Afterwards, 5.9 g of the resulting solid were suspended in dry toluene and 0.91 mmoles of Me$_2$ Si—O—SiMe$_2$[Cp] $_2$ZrCl$_2$ were added. The reaction mixture was kept at room temperature, under mechanical stirring for 3 hours. The solid in suspension was filtered and washed several tines (5×200 ml) with dry toluene and then dried for 24 hours under reduced pressure. The resulting solid catalyst contains 1.32% N, 6.2% Al and 0.17% Zr.

EXAMPLE 11

Catalyst C-6

30.5 mmoles of methylaluminoxane (MAO) in 20 ml of toluene were added to 0.335 g of rac-Et[Ind]$_2$ZrCl$_2$. Then 60 ml of toluene were added to the mixture. The reaction mixture was kept at 60° C. under continuous magnetic stirring for 10 minutes. Aftewards, the resulting solution was added over a slurry of 6.25 g of support S-4 in 100 ml of toluene. The reaction mixture was kept at 60° C. under continuous mechanical stirring for 4 hours. The resulting solid was filtered and washed several times with toluene (5×100 ml), and then was dried for 12 hours under reduced pressure. The resulting solid catalyst contains 7.14% Al, 0.37% Zr and 0.67% N.

EXAMPLE 12

Catalyst C-7

The same process as in example 6 was carried out but 3.4 g of the support S-1, 21.3 mmoles of MAO and 4.1 mmoles of ClSiMe$_2$CpCpZrCl$_2$ were used. The resulting solid catalyst contained 1.32% Zr.

POLYMERIZATIONS

EXAMPLE 13

A 500 cc flask equipped with a magnetic stirring bar and with two necks sealed with a septum (one neck for the injection of the co-catalyst and the other one for the continuous feeding of ethylene) was dried and degassed with a nitrogen flux. In the flask 200 cc of dried and recently distilled toluene were injected. The flask was introduced in a water thermostated bath at 40° C. When the thermal balance was reached, the solvent was saturated with ethylene, under the pressure of 1.037 bars (1.023 atm), keeping the system under continuous stirring. 10 ml of a MAO solution in toluene (1.5 M on the total aluminium) were injected. After one minute 3 ml of a suspension of 1 g of the catalyst C-1 in 10 ml of toluene were injected. The system was fed with ethylene during 5 minutes. After this tunie the flux of ethylene was stopped and 20 ml of acidified methanol were injected. 3.72 g of polymer were obtained (2705 kg PE/mole Zr×h×atm). The essential characteristics of the obtained polyethylene were: [η]=2.4 dl/g, Mn=67561, Mw=241224, Mw/Mn=3.57, Tm=134° C.

EXAMPLE 14

Ethylene was polymerized under the same conditions as in example 13 but the order of the addition of the co-catalyst and of the catalyst was changed. First of all 1 ml of a suspension of 1 g of catalyst C-1 in 10 ml of toluene was injected and immediately afterwards 3.25 ml of a solution of MAO in toluene (1.5 M on the total aluminum). 2.66 g of polymer were obtained after 13 minutes of polymerization (2232 kg PE/mole Zr×h×atm). The essential characteristics of the obtained polyethylene were: [η]=4.4. dl/g, Mn=170700, Mw=550800, Mw/Mn=3.2, Tm=136.5° C.

EXAMPLE 15

Ethylene was polymerized under the same conditions as in example 13 but using the catalyst C-2. 5.8 ml of a MAO solution in toluene (1.5 M on the total aluminium) and 0.726 g of the catalyst C-2 were injected. 1.4 g of polymer were obtained after 15 minutes of polymerization (271 kg PE/mole Zr×h×bar).

EXAMPLE 16

Ethylene was polymerized under the same conditions as in example 15 but using the catalyst C-5. 5.8 ml of a MAO solution in toluene (1.5 M on the total aluminum) and 0.561 g of the catalyst C-5 were injected 3.6 g of polymer were obtained after 15 minutes of polymerization (664 kg PE/mole Zr×h×bar).

EXAMPLE 17

Figure 2:
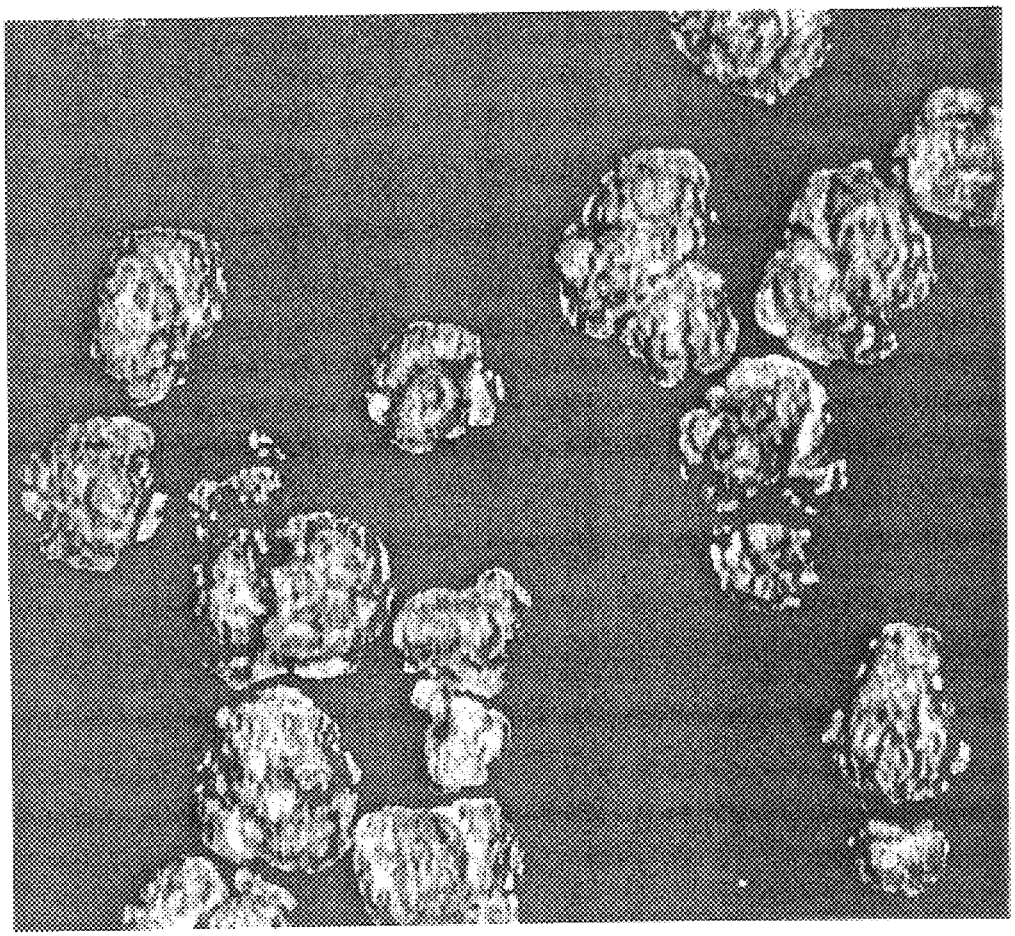
FIG. 2 is an enlarged picture of polymer of example 17.

600 cc of n-heptane were added to a 1 l glass reactor previously dried and degased. The temperature was raised to 70° C. and the solvent was stirred at 1200 rpm. When the thermal balance was achieved the medium was saturated with ethylene at 4 bar (3.95 atm of pressure). Afterwards the pressure has been reduced to 2 bars and. 8.63 ml of a MAO solution in toluene were added (1.5 M on the total aluminum). The pressure was raised to 4 bars and then after 2 minutes 0.35 g of the catalyst C-1 were added. The system was fed with ethylene for 15 minutes and then the polymerization was stopped blocking the flux of ethylene and adding 20 ml of acidified methanol. 18.56 g of polymer were obtained (989 kg PE/mole Zr×h×bar). The essential characteristics of the obtained polyethylene were: [η]=2.40 dl/g, Mn=94100, Mw=251939, Mw/Mn=2.67, Tm=138° C. The maximum average diameter of the polymer particles is 22 times higher than the ones of the catalyst particles, showing a value of 1.77 mm, without particles smaller than 150 μm. The polymer is a good replica of the particle size distribution (FIG. 1) and of the morphology of the catalyst (FIG. 2), thus obtaining polymer particles with 76% of spherical factor.

EXAMPLE 18

Ethylene was polymerized as in example 17 but using the catalyst C-3,. 9. 10 ml of a solution of MAO in toluene (1.5 M on the total aluminum) and 0.15 g of the catalyst C-3 were added. After 15 minutes of polymerization 27.30 g of polymer were obtained (3457 kg PE/mole Zr×h×bar). The essential characteristics of the obtained polyethylene were: [η]=2.65 dl/g, Mn=86612, Mw=270113, Mw/Mn=3.1, Tm=137° C. The maximum average diameter of the polymer particles is 30 times higher than the catalyst particles, having a value of 1.80 mm, only 4.1% of the particles is smaller than 500 μm, without particles lower than 150 μm.

Figure 3:
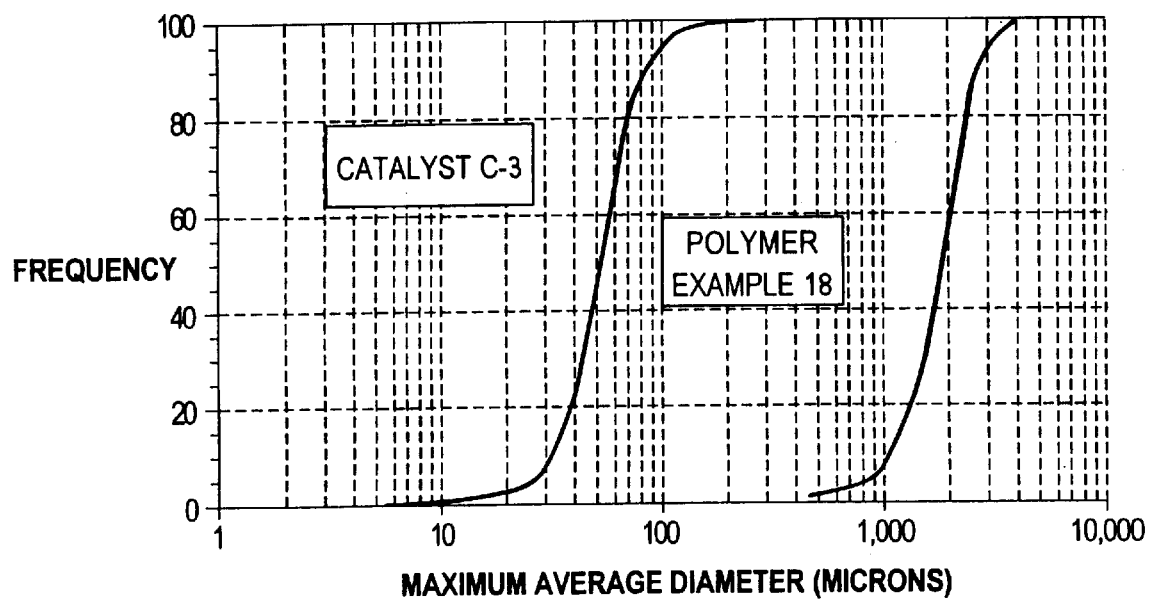
FIG. 3 shows the distribution of the particles of catalyst C-3 compared with the distrubition of the particles of the polymer of example 18 wherein the catalyst C-3 has been used.
Figure 4:
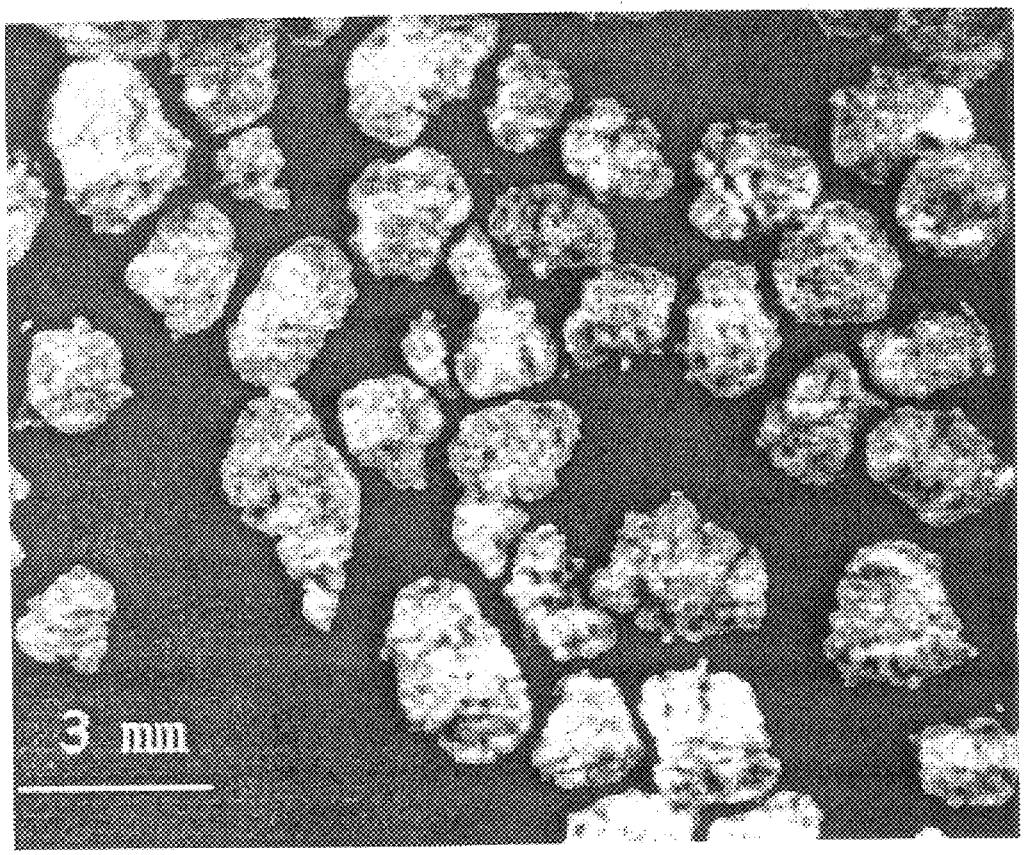
FIG. 4 is an enlarged picture of polymer of example 18.

The polymer is a good replica of the particle size distribution (FIG. 3) and of the morphology of the catalyst (FIG. 4) thus obtaining polymer particles with 82% of spherical factor.

EXAMPLE 19

Ethylene was polylmerized as in example 17 but using the catalyst C-4. 6.40 ml of a MAO solution in toluene (1.5 M on the total aluminum) and 0.14 g of catalyst C-4 were added. After 15 minutes of polymerization 25.78 g of polymer were obtained (1632 kg PE/mole Zr×h×bar). The essential characteristics of the obtained polyethylene were: [η]=1.9 dl/g, Mn=54904, Nw=184969, Mw/n=3.37, Tm=135° C.

EXAMPLE 20

Ethylene and 1-hexene were copolimerized by using the same method as in example 19, with the difference that once the solvent was added and before the pressurization of the reactor, 39.42 ml of dried and recently distilled 1-hexene were injected. 10 ml of a MAO solution in toluene (1.5 M on the total aluminum) and 0.18 g of catalyst C-4 were used. After 15 minutes of polymerization 97.55 g of polymer were obtained (4704 kg PE/mole Zr×h×bar). The main characteristics of the obtained polyethylene were: [η]=0.7 dl/g, Mn=21400, Mw=42827, Mw/Mn=2.0, Tm=114° C. The determined content in 1-hexene by $^{13}$C-NMR was 2.32% by moles with a random distuibution.

EXAMPLE 21

Ethylene was polymetized as in example 19 but with a starting hydrogen pressure of 0.5 bar. 6.87 ml of a MAO solution in toluene (1.5 M on the total aluminum) and 0.16 g of C-4 catalyst were used. After 15 minutes of polymerization 18.0 g of polymer were obtained (1013 kg PE/mole Zr×h×bar). The main characteristics of the obtained polyethylene were: Mn=5906, Mw=10066, Mw/Mn=1.7, Tm=128° C.

EXAMPLE 22

Ethylene was polymerized as in example 17 but using catalyst C-5.9 ml of a MAO solution in toluene (1.5 M on the total aluminum) and 0.47 g of catalyst C-5 were added. After 15 minutes of polymerization 8.2 g of polymer were obtained (959 kg PE/mole Zr×h×bar). The obtained polymer has a [η]=2.0 dl/g.

EXAMPLE 23

Ethylene was polymerized as in example 17 but using the catalyst C-6. 6.22 ml of a solution of MAO in toluene (1.5 M on total aluminum) and 0.16 g of the catalyst C-6 were added. After 15 minutes of polymerization 5.7 g of polymer were obtained (880 Kg PE/mole Zr×h×bar).

EXAMPLE 24

Ethylene and 1-hexene were copolymerized by using the same method as in example 20 but using the catalyst C-7. 10 ml of dried and recently distilled 1-hexene, 6.7 ml a solution of MAO in toluene (1.5 M on the total aluminum) and 0.069 g of the catalyst C-7 were added. After 15 minutes of polymerization 12.47 g of polymer were obtained (1250 kg PE/mole Zr×h×bar). The main characteristics of the obtained polyethylene were: Mn=44700, Mw=84100, Mw/Mn=1.88, the determined content in 1-hexene by $^{13}$C-NMR was 0.95% by moles with a random distribution.

What is claimed is:

1. A process for obtaining polyolefins comprising the step of polymerizing α-olefins under polymerizing conditions with a heterogeneous catalyst component (A) and a co-catalyst (B) to obtain a polymer products, said heterogeneous catalyst component (A) comprising a functionalized support (A.1), an organo aluminum compound (A.2) and at least one metallocene complex of any of groups 3, 4, 5 and 6 of the periodic table (A.3), wherein said metallocene complex (A.3) is linked to the functionalized support (A.1) through said organo aluminum compound (A.2), and wherein:

a) said functionalized support (A.1) results from the reaction of an inorganic porous support comprising one or more oxides of the elements of any of groups 2, 13 and 14 of the periodic table, dehydrated or not, and a functionalizing compound of general formula:

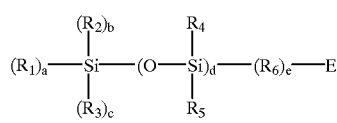

(I)

wherein:

$R_1$ is halogen, an alkoxide of formula OR, R being a branched or a non-branched alkyl group having from 1 to 6 carbon atoms, a $C_5$–$C_7$ cycloalkyl group, a $C_6$–$C_{10}$ aryl group, a $C_2$–$C_{10}$ alkenyl group, a $C_7$–$C_{10}$ arylalkyl group or a $C_7$–$C_{40}$ alkylaryl group;

$R_2$, $R_3$, $R_4$ and $R_5$ are the same or different from each other, are linear or branched $C_1$–$C_6$ alkyl groups, $C_5$–$C_7$ cycloalkyl groups, $C_6$–$C_{10}$ aryl groups, $C_2$–$C_{10}$ alkenyl groups, $C_7$–$C_{10}$ arylalkyl groups, or $C_7$–$C_{40}$ alkylaryl groups;

$R_6$ is a methylene group or propylene group;

E is selected from the group consisting of —NH$_2$, —NHR, —SH, —OH, and —PHR wherein R has the above defined meaning;

the sum of a+b+c is equal to 3, a being always higher than 0; and, d, e independently have values between 0 and 10; and b) said metallocene complex of any of groups 3, 4, 5 and 6 of the periodic table (A.3) is represented by the general formula III:

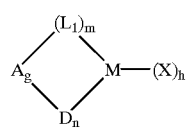

(III)

wherein:

M is a transition metal of the groups 3, 4, 5 or 6 of the periodic table;

each X is independently selected from the group consisting of hydrogen, halogen, linear or branched alkyl groups having from 1 to 10 carbon atoms, $C_1$–$C_{10}$ alkoxyl groups, $C_5$–$C_7$ cycloalkyl groups, $C_6$–$C_{10}$ aryl groups, $C_6$–$C_{10}$ aryloxyl groups, $C_2$–$C_{10}$ alkenyl groups, $C_7$–$C_{10}$ arylalkyl groups, $C_7$–$C_{40}$ alkylaryl groups and $C_8$–$C_{40}$ arylalkenyl groups;

$L_1$ is selected from the group consisting of cyclopentadienyl (Cp) of formula

(h)

indenyl (Ind) of formula

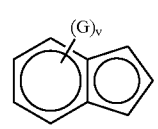

(i)

and fluorenyl (Flu) of formula

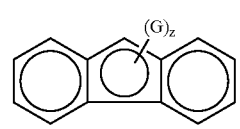

(l)

wherein each G is independently selected from the group consisting of hydrogen, linear or branched alkyl groups having from 1 to 10 carbon atoms, $C_5$–$C_7$ cycloalkyl groups optionally substituted by an alkyl group having from 1 to 6 carbon atoms, $C_6$–$C_{10}$ aryl groups, $C_2$–$C_{10}$ alkenyl groups, $C_7$–$C_{10}$ arylalkyl groups and $C_7$–$C_{40}$ alkylaryl groups; a group of general formula (IV)

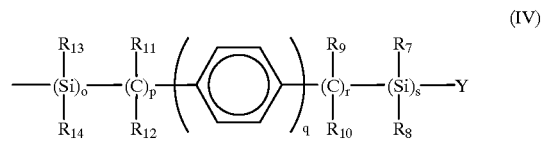

(IV)

wherein:

$R_7$, $R_8$, $R_9$, $R_{10}$, $R_{11}$, $R_{12}$, $R_{13}$, and $R_{14}$ are the same or different from each other, are hydrogen, linear or branched alkyl groups having from 1 to 10 carbon atoms, $C_5$–$C_7$ cycloalkyl groups, optionally substituted by an alkyl group having from 1 to 6 carbon atoms, $C_6$–$C_{10}$ aryl groups, $C_2$–$C_{10}$ alkenyl groups, $C_7$–$C_{10}$ arylalkyl groups or $C_7$–$C_{40}$ alkylaryl groups, and provided that $R_7$ and $R_8$ optionally are equal to Y;

Y is optionally a halogen or $NR_{11}R_{12}$ or hydroxyl;

o, p, q, r, s are integers which have values between 0 and 10;

u=5-g;

v=7-g;

z=9-g;

D is equal to $L_1$ or is a heteroatom belonging to group 13, 14, 15, or 16 of the periodic table;

A is a group which binds the ligands $L_1$ and D according to the formula (V):

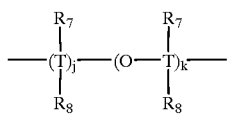

(V)

wherein T is selected from the group consisting of carbon, silicon, germanium and tin; j is an integer which has a value of 0, 1, 2, 3 or 4; k is an integer which has a value of 0, 1, 2 or 3; m, n, and h are integers having a sum equal to 4; m and n have values of 0, 1 or 2 so that their sum is 1 or 2; h is no higher than 3; g is an integer between 0 and 2; and when h is equal to 3 then the sum of m+n is equal to 1 and g is 0.

2. The process of claim 1 wherein the metallocene complex is represented by the following formula (IIIa):

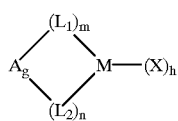

(III)a wherein

M is a transition metal of the group 3, 4, 5, or 6 of the periodic table;

each X is independently selected from the group consisting of hydrogen, halogen, linear or branched alkyl groups having from 1 to 10 carbon atoms, $C_1$–$C_{10}$ alkoxyl groups, $C_5$–$C_7$ cycloalkyl groups, $C_6$–$C_{10}$ aryl groups, $C_6$–$C_{10}$ aryloxyl groups, $C_2$–$C_{10}$ alkenyl groups, $C_7$–$C_{10}$ arylalkyl groups, $C_7$–$C_{40}$ alkylaryl groups and $C_8$–$C_{40}$ arylalkenyl groups; $L_1$, $L_2$ are independently selected from the group consisting of cyclopentadienyl (Cp.) of formula

indenyl (Ind) of formula

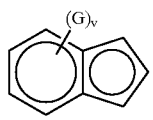

and fluorenyl (Flu) of formula

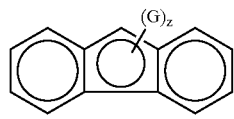

wherein each G is independenly selected from the group consisting of hydrogen, linear or branched alkyl groups from 1 to 10 carbon atoms, $C_5$–$C_7$ cycloalkyl groups which optionally are substituted by an alkyl group having from 1 to 6 carbon atoms, $C_6$–$C_{10}$ aryl groups, $C_2$–$C_{10}$ alkenyl groups, $C_7$–$C_{10}$ arylalkyl groups and $C_7$–$C_{40}$ alkylaryl groups, compound of general formula (IV)

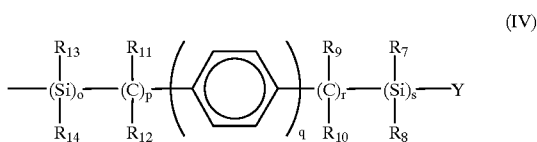

wherein:

$R_7$, $R_8$, $R_9$, $R_{10}$, $R_{11}$, $R_{12}$, $R_{13}$ and $R_{14}$ are the same or different from each other, are hydrogen, linear or branched alkyl groups having from 1 to 10 carbon atoms, $C_5$–$C_7$ cycloalkyl groups, optionally substituted by an alkyl group having from 1 to 6 carbon atoms, $C_6$–$C_{10}$ aryl groups, $C_2$–$C_{10}$ alkenyl groups, $C_7$–$C_{10}$ arylalkyl groups or $C_7$–$C_{40}$ alkylaryl groups, and provided that $R_7$ and $R_8$ optionally are equal to Y and Y is a halogen or hydroxyl;

o, p, q, r, s are integers which have values between 0 and 10;

u=5-g;

v=7-g;

z=9-g;

A is a group which binds the ligands $L_1$ and $L_2$ according to the formula (V):

(V)

—(T)$_j$—(O—T)$_k$— with $R_7$, $R_8$ substituents wherein T is selected from the group consisting of carbon, silicon, germanium and tin; j is an integer which has a value of 0, 1, 2, 3, or 4; k is an integer which has a value of 0, 1, 2, or 3;

m, n and h are integers with a sum of 4; m and n have the values of 0, 1, or 2 so that their sum is 1 or 2; h is no higher than 3; g is an integer between 0 and 2; and when h is equal to 3 then the sum of m+n is equal to 1 and g is 0.

3. The process of claim 2 wherein in the metallocene formula (IIIa) M is selected from the group consisting of Ti, Zr, and Hf.

4. The process of claim 2 wherein in formula (IV), Y is selected from the group-consisting of Cl, Br, and I.

5. The process of claim 1 wherein the inorganic porous support is an inorganic compound with superficial hydroxyl groups selected from the group consisting of oxides, silicates, carbonates, phosphates, clay, and their mixtures.

6. The process of claim 5 wherein the inorganic porous support is selected from the group consisting of silica and silica in combination with oxides selected from the group consisting of oxides of aluminum, titanium, vanadium, chromium, phosphorous, aluminum and phosphorous and their mixtures.

7. The process of claim 1 wherein the surface area of the inorganic porous support ranges from 10 $m^2$/g to 1000 $m^2$/g, the pore volume varies between 0.2 $cm^3$/g and 4 $cm^3$/g, and the average particle size varies between 1 $\mu$m and 500 $\mu$m.

8. The process of claim 7 wherein the surface area of the inorganic porous support ranges from 150 $m^2$/g to 650 $m^2$/g, the pore volume varies between 0.6 $cm^3$/g and 4 $cm^3$/g, and the average particle size varies between 5 $\mu$m and 200 $\mu$m.

9. The process of claim 1 wherein the surface concentration of hydroxyl groups on the inorganic support varies between 0.1 meq OH/g and 4 meq OH/g of support.

10. The process of claim 9 wherein the surface concentration of hydroxyl groups on the inorganic porous support varies between 0.3 meq OH/g and 3 meq OH/g of support.

11. The process of claim 1 wherein in the metallocene formula (III) M is selected from the group consisting of Ti, Zr, and Hf.

12. The process of claim 1 wherein in formula (IV) Y is selected from the group consisting of Cl, Br, and I.

13. The process of claim 1 wherein the organo aluminium compound is an alkylaluminoxane having from 4 alkyl groups to 50 alkyl groups each containing from 2 carbon atoms to 20 carbon atoms.

14. The process of claim 1 wherein the ratio between the quantities of the inorganic porous support and the functionalizing compound of formula (I) is such that the molar ratio between hydroxyl groups and $R_1$ groups of formula (I) ranges from 0.10 to 6.

15. The process of claim 1 wherein the ratio between the quantities of the inorganic porous support and the functionalizing compound of formula (I) is such that the molar ratio between hydroxyl groups and $R_1$ groups of formula (I) ranges from 0.2 to 4.

16. The process of claim 1 wherein the ratio between the quantities of the functionalized support (A.1) and of the organo aluminium compound (A.2) is such that the ratio of Al to the functionalized support ranges from 0.05 mmoles Al/g support to 30 mmoles Al/g support.

17. The process of claim 16 wherein the ratio between the quantities of the functionalized support (A.1) and of the organo aluminium compound (A.2) is such that the ratio of Al to the functionalized support ranges from 1 mmoles Al/g support to 15 mmoles Al/g support.

18. The process of claim 1 wherein the ratio of the quantities of the functionalized support (A.1) and of the metallocene complex (A.3) is such that the ratio transition metal M/g of the functionalized support ranges from 0.01 mmoles M/g of support to 10 mmoles M/g of support.

19. The process of claim 18 wherein the ratio of the quantities of the functionalized support (A.1) and of the metallocene complex (A.3) is such that the ratio transition metal M/g of the functionalized support ranges from 0.1 mmoles M/g of support to 7 mmoles M/g of support.

20. The process of claim 1 wherein the co-catalyst (B) comprises a non-coordinative ionizing compound.

21. The process of claim 20 wherein the co-catalyst (B) is selected from the group consisting of alkyl aluminoxanes, bulky boron compounds, and alkyl aluminum.

22. The process of claim 1 wherein said polymerizing conditions include a polymerization temperature of from −60° C. to 280° C., a polymerization pressure of from 1 atm. to 2000 atm., a concentration of the transition metal of from $10^{-7}$ to $10^{-3}$ moles/l of solvent, and a molar ratio of co-catalyst (B) aluminum/transition metal of between 10 and 10000 when using an organo aluminium compound and a molar ratio of co-catalyst (B) boron/transition metal of between 0.5 and 10 when using a boron compound.

23. The process of claim 1 wherein said α-olefin is ethylene.

24. The process of claim 1 wherein said α-olefin is selected from the group consisting of 1-butene, 1-hexene, 1-octane, 1-hexadecane, 4-methylpentane, and mixtures thereof.

* * * * *